US008559271B2

(12) United States Patent
Barakat et al.

(10) Patent No.: US 8,559,271 B2
(45) Date of Patent: Oct. 15, 2013

(54) SYSTEMS AND METHODS FOR SEISMIC DATA ACQUISITION EMPLOYING ASYNCHRONOUS, DECOUPLED DATA SAMPLING AND TRANSMISSION

(75) Inventors: Simon Barakat, Chilly-Mazarin (FR); Kambiz Iranpour, Oslo (NO); Daniel H. Golparian, Oslo (NO)

(73) Assignee: WesternGeco L.L.C., Houston, TX (US)

(*) Notice: Subject to any disclaimer, the term of this patent is extended or adjusted under 35 U.S.C. 154(b) by 488 days.

(21) Appl. No.: 12/626,639

(22) Filed: Nov. 26, 2009

(65) Prior Publication Data
US 2010/0074054 A1    Mar. 25, 2010

Related U.S. Application Data

(62) Division of application No. 11/683,883, filed on Mar. 8, 2007, now Pat. No. 7,660,203.

(51) Int. Cl.
*G01V 1/22* (2006.01)
(52) U.S. Cl.
USPC .................................. 367/63; 367/59; 367/76
(58) Field of Classification Search
USPC .......................................... 367/76–77, 59, 63
See application file for complete search history.

(56) References Cited

U.S. PATENT DOCUMENTS

| 4,281,403 | A |   | 7/1981  | Siems et al. |         |
|-----------|---|---|---------|--------------|---------|
| 4,663,744 | A | * | 5/1987  | Russell et al. | 367/76 |
| 5,724,241 | A | * | 3/1998  | Wood et al. | 702/14 |
| 6,002,640 | A | * | 12/1999 | Harmon | 367/38 |
| 6,044,453 | A |   | 3/2000  | Paver |         |
| 6,049,882 | A |   | 4/2000  | Paver |         |
| 6,055,620 | A |   | 4/2000  | Paver et al. |   |
| 6,148,392 | A |   | 11/2000 | Liu |         |
| 7,269,095 | B2 | * | 9/2007  | Chamberlain et al. | 367/76 |
| 7,660,203 | B2 |   | 2/2010  | Barakat et al. |   |
| 2002/0193947 | A1 |   | 12/2002 | Chamberlain |   |
| 2003/0174582 | A1 |   | 9/2003  | Scott |         |

(Continued)

FOREIGN PATENT DOCUMENTS

| CN | 1653358 A | 8/2005 |
| GB | 2406250 B | 4/2006 |

OTHER PUBLICATIONS

International Search Report of PCT Application Serial No. PCT/US2008/055854 dated Jul. 29, 2009.

(Continued)

*Primary Examiner* — Ian Lobo

(57) ABSTRACT

Systems and methods for asynchronously acquiring seismic data are described, one system comprising one or more seismic sources, a plurality of sensor modules each comprising a seismic sensor, an A/D converter for generating digitized seismic data, a digital signal processor (DSP), and a sensor module clock; a seismic data recording station; and a seismic data transmission sub-system comprising a high precision clock, the sub-system allowing transmission of at least some of the digitized seismic data to the recording station, wherein each sensor module is configured to periodically receive from the sub-system an amount of the drift of its clock relative to the high precision clock. This abstract is provided to comply with rules requiring an abstract to ascertain the subject matter of the disclosure. It is submitted with the understanding that it will not be used to interpret or limit the scope or meaning of the claims. 37 CFR 1.72(b).

17 Claims, 3 Drawing Sheets

(56) References Cited

U.S. PATENT DOCUMENTS

| | | | |
|---|---|---|---|
| 2004/0105341 A1* | 6/2004 | Chamberlain et al. | 367/21 |
| 2005/0047275 A1* | 3/2005 | Chamberlain et al. | 367/56 |
| 2005/0276162 A1 | 12/2005 | Brinkmann et al. | |
| 2006/0009911 A1 | 1/2006 | Burkholder et al. | |
| 2006/0018195 A1* | 1/2006 | Chamberlain | 367/59 |
| 2006/0018196 A1 | 1/2006 | Chamberlain | |
| 2006/0192625 A1 | 8/2006 | Sorrells et al. | |
| 2006/0203614 A1 | 9/2006 | Harmon | |
| 2006/0215588 A1 | 9/2006 | Yoon | |
| 2006/0226916 A1 | 10/2006 | Florescu et al. | |
| 2006/0247505 A1* | 11/2006 | Siddiqui | 600/300 |
| 2006/0251081 A1 | 11/2006 | Choksi | |
| 2007/0025484 A1 | 2/2007 | Laine et al. | |
| 2007/0189118 A1* | 8/2007 | Chamberlain | 367/76 |
| 2007/0253289 A1* | 11/2007 | Chamberlain et al. | 367/51 |
| 2008/0170469 A1* | 7/2008 | Phillips et al. | 367/76 |
| 2008/0189044 A1* | 8/2008 | Chamberlain et al. | 702/14 |

OTHER PUBLICATIONS

Examination Report of European Application Serial No. 08825844.7 dated Jun. 28, 2011.

Office Action of Chinese Application Serial No. 200880013156.6 dated Sep. 7, 2011.

Bengt Oelmann, "Asynchronous Design," Eleotroniks Design Division, Updated Sep. 2005, retrieved Feb. 28, 2007: pp. 1-5, <http://apachepersonal.miun.se/~benoel/asynch.htm>.

Anonymous, "What's New: Network Dictionary" Javvin Network Protocols Guide, Network Monitoring & Analysis Tools, retrieved Feb. 28, 2007: p. 1, <http://javvin.com/>.

Anonymous, "WPAN: Wireless Personal Area Network Communication Technologies," Network Dictionary, retrieved Feb. 28, 2007: pp. 1-4, <http://www.networkdictionary.com/wireless/WPAN.php?PHPSESSID=354101c49bc9d97659791acaecddca16>.

Anonymous, "WiMAX Tutorial," retrieved Feb. 28, 2007: pp. 1-6, <http://www.tutorial-reports.com/wireless/wimax/tutorial.php>.

Deborah Halber, "Researchers fired up over new battery," Massachusetts Institute of Technology News Office, Feb. 2006, retrieved Feb. 28, 2007: pp. 1-2, <http://web.mit.edu/newsoffice/2006/batteries-0208.html>.

Anonymous, "Q-Technology: Raising the standards of seismic data quality," WesternGeco, retrieved Feb. 28, 2007: p. 1, <http://www.westerngeco.com/q_technology>.

* cited by examiner

SYSTEMS AND METHODS FOR SEISMIC DATA ACQUISITION EMPLOYING ASYNCHRONOUS, DECOUPLED DATA SAMPLING AND TRANSMISSION

CROSS-REFERENCE TO RELATED APPLICATIONS

This application is a divisional of U.S. patent application Ser. No. 11/683,883, filed Mar. 8, 2007, which is incorporated herein by reference.

BACKGROUND OF THE INVENTION

1. Field of Invention

The present invention relates to the field of seismic data acquisition systems and methods of using same. More specifically, the invention relates to systems and methods for seismic data acquisition in which the seismic sampling is decoupled from data transmission using asynchronous digital signal processors for data sampling, and interpolation for synchronizing the sampling.

2. Related Art

Land seismic acquisition aims to capture the acoustic and elastic energy that has propagated through the subsurface. This energy may be generated by one or more surface sources such as vibratory sources (vibrators). The vibrators produce a pressure signal that propagates through the earth into the various subsurface layers. Here elastic waves are formed through interaction with the geologic structure in the subsurface layers. Elastic waves are characterized by a change in local stress in the subsurface layers and a particle displacement, which is essentially in the same plane as the wavefront. Acoustic and elastic waves are also known as pressure and shear waves. Acoustic and elastic waves are collectively referred to as the seismic wavefield.

The structure in the subsurface may be characterized by physical parameters such as density, compressibility, and porosity. A change in the value of these parameters is referred to as an acoustic or elastic contrast and may be indicative of a change in subsurface layers, which may contain hydrocarbons. When an acoustic or elastic wave encounters an acoustic or elastic contrast, some part of the waves will be reflected back to the surface and another part of the wave will be transmitted into deeper parts of the subsurface. The elastic waves that reach the land surface may be measured by motion sensors (measuring displacement, velocity, or acceleration, such as geophones, accelerometers, and the like) located on the land. The measurement of elastic waves at the land surface may be used to create a detailed image of the subsurface including a quantitative evaluation of the physical properties such as density, compressibility, porosity, etc. This is achieved by appropriate processing of the seismic data.

Seismic sensor units typically also contain the electronics needed to digitize and record the seismic data. In one known embodiment, each sensor unit is connected to a land seismic cable, which is connected via cables to a recording instrument on a surface vehicle or other surface facility such as a platform. The land seismic cable provides electric power and the means for transferring the recorded and digitized seismic signals to the recording instrument. In other embodiments, there have been efforts to reduce the use of cables in performing land seismic, with movement toward wireless land seismic systems and methods.

Seismic sampling in a typical seismic sensor network (whether wired or wireless) may comprise up to tens of thousands or more seismic sensors measuring the seismic vibrations for oil and gas exploration. Each sensor with an analogue output has its output converted to a digital signal by an analog to digital converter (ADC) that is in turn connected to a digital signal processing (DSP) unit. Every sampling unit has its own clock frequency that drifts over time relative to the data transmission line clock that may assumed to be the master clock. The digital data is typically transmitted to a centralized recording unit. The individual sampling ADC/DSP units are traditionally phase-synchronized to the data transmission line clock by an electronic phase-locked loop (PLL).

While these systems and methods have enjoyed some success, there remains room for improvement. It is of utmost important in seismic acquisition to phase synchronize the sampling of all the sampling units. However, presently known systems and methods are more expensive and less flexible due to the above-mentioned individual sampling ADC/DSP units being phase-synchronized to the data transmission line clock by an electronic phase-locked loop. There is a need in the seismic data acquisition arts for systems and methods wherein the transmission of data is decoupled from sampling of the data, and that eliminate the costly and inflexible electronic phase locking loop, while still ensuring that the output sampling frequency of each signal processing unit is phase synchronized with the data transmission line clock. The present invention is devoted to addressing one or more of these needs.

SUMMARY OF THE INVENTION

In accordance with the present invention, systems and methods for seismic data acquisition are described which reduce or overcome short-comings of previously known systems and methods wherein the transmission of data is coupled to sampling of the data. Systems and methods of seismic data acquisition in accordance with the invention eliminate the costly and inflexible electronic phase locking loop. In the inventive systems and methods, the drift of each clock associated with a seismic sensor is periodically measured and/or calculated relative to the data transmission line clock (which may be the master clock), and interpolation techniques are used to adjust for the sensor clock drift. In this way the output sampling frequency of each signal processing unit is phase synchronized with the data transmission line clock without the use of an electronic phase locked loop circuit. Systems and methods of the invention allow more efficient seismic data acquisition, for example 2-D, 3-D and 4-D land seismic data acquisition, such as during exploration for underground hydrocarbon-bearing reservoirs, or monitoring existing reservoirs. Electromagnetic signals may be used to transfer data to and/or from the sensor units, to transmit power, and/or to receive instructions to operate the sensor units.

A first aspect of the invention is seismic data acquisition system comprising:
one or more seismic sources (which may be land sources, such as vibrators, explosive charges, and the like, or marine sources, such as air-guns, vibrators, and the like);
a sensor system (which may be suitable for land seismic or marine seismic) for acquiring and/or monitoring analog seismic sensor data, the sensor system comprising a plurality of sensor modules each configured to asynchronously sample seismic data and comprising a seismic sensor, an A/D converter (ADC) for generating digitized seismic data, a digital signal processor (DSP), and a sensor module clock;

a seismic data recording station, and a seismic data transmission sub-system comprising a high precision clock, the sub-system allowing the DSP to transmit at least some of the digitized seismic data to the recording station, wherein each sensor module receives periodically from the sub-system an amount of the drift of its clock relative to the data transmission line high precision clock.

Alternatively, in certain system embodiments of the invention, rather than each sensor module periodically receiving an amount of drift from the data transmission sub-system, each DSP may periodically receive information from outside the system (for example via GPS) to calculate its clock drift. In yet other system embodiments, both techniques may be employed.

Systems of the invention may comprise each DSP in the sensor system upsampling data at a particular fixed sampling rate relative to the high precision clock. The data is upsampled using a linear or nonlinear interpolation technique, based on the amount of drift of each sensor module clock relative to the data transmission line high precision clock, to increase its effective sampling rate. The data may then be decimated (downsampled to a fixed sampling frequency) relative to the high precision clock. The period between intermittent adjustments of the sampling frequency to the high frequency clock may be determined based on the nominal drift of the sensor module clocks, for example 50 parts per million (ppm), and the level of noise allowed in the system.

Optionally, the data transmission sub-system allows transmission of data to one or more base stations, which in turn transmit at least some of the data they receive to the recording station, which may be advantageous in wireless systems and methods of the invention. Wireless versions of systems of the invention may be characterized as comprising a wireless data network, wherein the wireless data network comprises the seismic sensors transmitting at least a portion of the data to one or more base stations via first wireless links which in turn transmit at least some data they receive to the recording station via second wireless links (for a completely wireless system), or through cables, wires, or optical fibers in other embodiments (partially wireless). Also as further explained herein, the recording station need not be on land, and need not be immobile. For example, the recording station may be selected from a stationary land vehicle, a moving land vehicle, a stationary marine vessel, a moving marine vessel, and a moving airborne vessel, such as a helicopter, dirigible, or airplane.

Base stations, if used in wireless or partially wireless systems, may be located strategically to cover predefined groups of sensor modules. In these embodiments, each group of sensor modules may relay data wirelessly via a mesh topology and/or in a hop to hop fashion (also referred to herein as multi-hopping). Star topologies and other topologies may also be used, but mesh topology will produce the greatest redundancy. Between each base station and the data recording station (for example recording truck), seismic data may be transferred directly from base station to recording station. Sensor modules may be spaced relatively close together in systems of the invention, for example a distance ranging from 1 meter up to about 10 meters. Because of the relatively short distance between sensor modules, multi-hopping may circumvent the potential wireless communication (RF, microwave, infra-red) problems in uneven terrain, or terrain including man-made obstacles. It is known that for transmitting data wirelessly between points A and B separated by a large distance, relaying between multiple spots between A and B will consume less energy compared to direct wireless communication between points A and B.

Systems within the invention include those comprising a first wireless link that wirelessly transmits seismic data sampled from a seismic sensor to a base station (which may be a mobile or non-mobile communication device), the base station having a second wireless link that receives the seismic data from the sensor modules and wirelessly transmits the seismic data to the land seismic data recording station, the one or more vibrators having a third wireless link that receives commands from the land seismic data recording station and wirelessly transmits vibrator data (such as status information) to the land seismic data recording station. As used herein the term "mobile", when used to describe a device, includes hand-held devices and devices that may be worn on the body of a person, for example on a belt, in a pocket, in a purse, and the like. It is not meant to include objects that may in fact be moved, but only with great effort, such as a building or shed, or with less effort a desk top computer.

In certain system embodiments the first wireless link may be selected from any wireless personal area network (WPAN) communication protocol. The second and third wireless links may be individually selected from any wireless communication protocol that supports point to multi-point (PMP) broadband wireless access. These protocols may include, but are not limited to IEEE standard 802.16 (sometimes referred to as the WiMax (Worldwide Interoperability for Microwave Access) standard), IEEE standard 802.20, and the like. The second and third wireless links may use the same or different protocols.

Certain land seismic data acquisition systems of the invention may utilize wireless links and equipment allowing broadcasting of messages (audio, video, alphanumeric, digital, analog, and combinations thereof) between sensor modules, vibrators, base stations, and the recording station, or simply between the sensor modules. The messages may be time tagged and used for distance measure and clock calibration. The communication network may also be used for transmission of status information and/or quality control (QC).

A second aspect of the invention comprises methods of acquiring seismic data during a seismic survey, including time-lapse (4-D) seismic data acquisition, one method comprising:

a) initiating one or more seismic sources;

b) asynchronously acquiring reflected analog seismic data using a sensor system, the sensor system comprising a plurality of sensor modules each comprising a seismic sensor, an A/D converter (ADC) for generating digitized seismic data, a digital signal processor (DSP), and a sensor module clock;

c) transmitting at least some of the digitized seismic data to a data recording station via a data transmission sub-system comprising a high precision clock having a high precision clock frequency; and d) correcting clock frequency drift of each sensor module clock relative to the data transmission line high precision clock frequency, and each sensor module receiving periodically from the sub-system an amount of the drift of its clock relative to the data transmission line high precision clock.

Other methods of the invention include passive listening surveys (where no vibratory source is used) and electromagnetic (EM) surveys, where one or more of the sensor units comprises one or more EM sensors.

As used herein, "survey" refers to a single continuous period of seismic data acquisition (which may occur simultaneously, sequentially, or with some degree of time overlap), over a defined survey area; multiple surveys means a survey repeated over the same or a same portion of a survey area but separated in time (time-lapse, sometimes referred to herein as 4-D seismic). In the context of the present invention a single seismic survey may also refer to a defined period of seismic data acquisition in which no controlled seismic sources are active (which also may be referred to alternatively as passive seismic listening or micro seismic measurements).

Systems and methods of using systems of the invention allow more efficient data acquisition (including time-lapse) than previously known systems and methods. These and other features will become more apparent upon review of the brief description of the drawings, the detailed description of the invention, and the claims that follow.

BRIEF DESCRIPTION OF THE DRAWINGS

The manner in which the objectives of the invention and other desirable characteristics may be obtained is explained in the following description and attached drawings in which.

Figure 1:
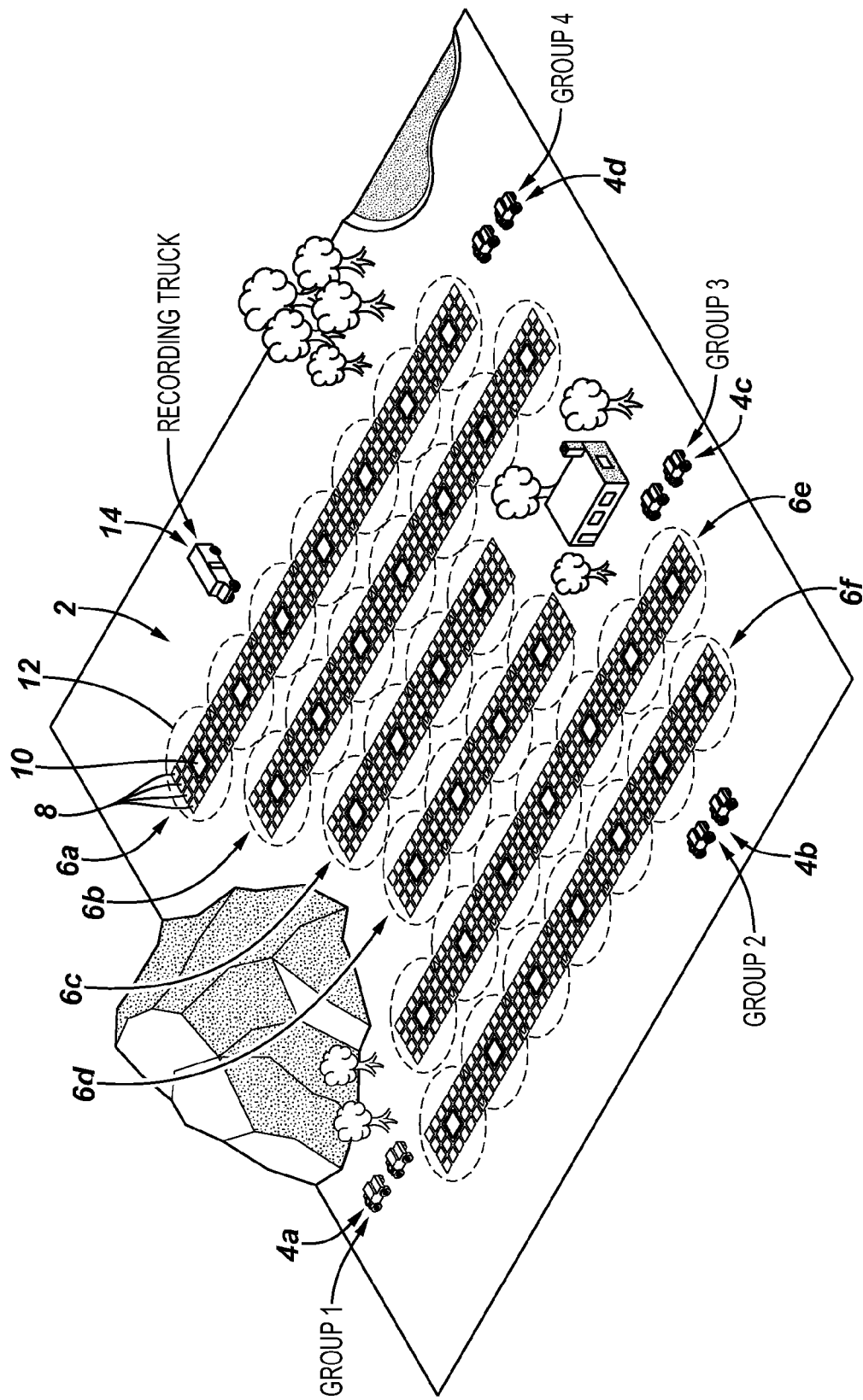
FIG. 1 illustrates a simplified plan view of a system of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

As noted in the literature and on the Internet (see for example, the website of Prof. Bengt Oelmann, Mid-Sweden University, Sundsvall, Sweden, accessed Dec. 10, 2006) digital designs can be divided into synchronous and asynchronous circuits. The common timing reference called clock signal defines the synchronous designs. Consequently, asynchronous designs are those without a common timing reference. In the early days of digital design, design methodologies were not established and combinations of synchronous and asynchronous techniques were used. From the 1960s to the present, the usage and the development of synchronous circuits and methods achieved almost total dominance. When computers were first constructed, a few of them were fully asynchronous. Two examples are ORDVAC from the University of Illinois (1951-52) and later, MU5 from the University of Manchester (1969-74). But asynchronous techniques have later found their applications in places where synchronous techniques are not feasible. A typical example is high-speed communication over long distances, such in computer bus systems. UNIBUS in PDP-11 (1969) and VMEBUS (1980) are examples of such asynchronous buses.

The growing complexity of ICs makes clock distribution in synchronous designs more costly to design in terms of power consumption, area, and design effort. The clock distribution problem has made asynchronous design techniques a viable alternative. Some of the research carried out in the field of asynchronous design searches for ways to utilize these advantages for solving real-world problems. Most of the work in this area is carried out at universities, but there is also some research in industry. For example, Sun MicroSystems Labs proposed a new processor architecture known under the trade designation "Counterflow Pipeline Processor", and Philips Research Labs has focused on designing low-power ICs using automatic synthesis of asynchronous circuits. In recent years a mixed synchronous/asynchronous approach, commonly referred to as Globally Asynchronous—Locally Synchronous (GALS), has been advocated (according to Oelmann). The basic idea is to have a local clock for each module on the chip and to have asynchronous communication between the synchronous modules. When considering other complex digital systems based on multiple ICs and PCBs, this seems to be a natural development for very complex ICs.

The systems and methods of the present invention offer one or more of the possible advantages discussed by Oelmann, and, as noted by at least this reference, asynchronous design methods differ significantly from the methods that are currently used. Some of the possible advantageous of asynchronous systems are the following:

Average case performance: In synchronous systems, the slowest combinational path defines the maximum clock frequency. This leads to worst-case performance for all operations independently on the data. Asynchronous data-paths are designed to indicate when computation is completed. The computation time for many operations is very data dependent and this property can be exploited in cases where the worst-case delay is much larger than the average delay.

No or reduced clock skew problems: In a synchronous system, the differences in arrival time of the clock signal to different parts of the system must be controlled. Clock skew affects speed performance and may also cause malfunctioning due to race conditions. The cost of maintaining low clock skew becomes higher when the complexity of the IC increases. Asynchronous circuits do not have a global clock signal and clock skew is therefore not a problem.

Low power consumption: Only active parts of a CMOS design dissipates power in CMOS. In a synchronous system, the clock signal is still active in the idle parts. The event-driven nature of asynchronous designs leads to the fact that only the parts of the design that actually take part in the computation are dissipating power.

Low noise: Simultaneous switching in CMOS leads to high current transitions in the power lines. In a synchronous system, the charge and discharge of the clock net is a large contributor to the current transitions. Most of the switching in the gates occurs shortly after the active clock edge. This makes the total current concentrated to the time of the active clock edge. The fast current transitions cause fluctuations on the power supply lines that may cause lowered speed performance or malfunctioning of the digital logic. In a mixed analog/digital system, the digital noise may affect sensitive analog circuits. Asynchronous circuits are not synchronized and the current is more uniformly distributed in time.

Modularity: In asynchronous modules, both timing and functionality may be located inside the module. From the user's point of view, only the sequence of operations is important when using the module. Incremental upgrading of the performance of the asynchronous system only requires the replacement of the module that is limiting the performance, without having to change or retime the system in any other way.

Scalability: In general, a digital system consists of different parts implemented in different technologies and these may be communicating over different types of media. Different types of design techniques are then used for different types of implementation technologies. A typical scenario is as follows: Inside the IC, a high-speed global clock signal is used that is generated from a phase-locked loop (PLL), which is synchronized to a slower external clock signal. Communication between the ICs on the same PCB is synchronized to the slower clock. Board-to-board communication is handled by an asynchronous standard bus system (such as VMEBUS). Crossing the boarders of implementation technologies makes it necessary to introduce new design techniques. By using asynchronous circuits from the beginning, it is possible to keep the same design technique throughout the system design.

As discussed in U.S. Pat. No. 6,049,882, "synchronous" systems apply a fixed time step signal (i.e., a clock signal) to the functional units to ensure synchronized execution. Thus, in synchronous systems, all the functional units require a clock signal. However, not all functional units need be in operation for a given instruction type. Since the functional units can be activated even when unnecessary for a given instruction execution, synchronous systems can be inefficient.

The use of a fixed time clock signal (i.e., a clock cycle) in synchronous systems also restricts the design of the functional units. Each functional unit must be designed to perform its worst case operation within the clock cycle even though the worst case operation may be rare. Worst case operational design reduces performance of synchronous systems, especially where the typical case operation executes much faster than that of the worst case criteria. Accordingly, synchronous systems attempt to reduce the clock cycle to minimize the performance penalties caused by worst case operation criteria. Reducing the clock cycle below worst case criteria requires increasingly complex control systems or increasingly complex functional units. These more complex synchronous systems reduce efficiency in terms of area and power consumption to meet a given performance criteria such as reduced clock cycles.

In asynchronous seismic data acquisition systems and methods of the invention, performance penalties only occur in an actual (rare) worst case operation, and the inventive systems and methods may be tailored for typical case performance, which can result in decreased complexity for processor implementations that achieve the performance requirements. Further, because asynchronous systems only activate functional units when required for the given instruction type, efficiency is increased. Thus, the asynchronous seismic data acquisition systems and methods of the invention may provide increased efficiency in terms of integration and power consumption.

A first aspect of the invention is seismic data acquisition system comprising:
one or more seismic sources (which may be land sources, such as vibrators, explosive charges, and the like, or marine sources, such as air-guns, vibrators, and the like);
a sensor system (which may be suitable for land seismic or marine seismic) for acquiring and/or monitoring analog seismic sensor data, the sensor system comprising a plurality of sensor modules each configured to asynchronously sample seismic data and comprising a seismic sensor, an A/D converter (ADC) for generating digitized seismic data, a digital signal processor (DSP), and a sensor module clock;
a seismic data recording station, and
a seismic data transmission sub-system comprising a high precision clock, the sub-system allowing the digital signal processor to transmit at least some of the digitized seismic data to the recording station,
wherein each sensor module clock has a clock frequency that drifts over time relative to a data transmission line high precision clock frequency, and each sensor module receives periodically from the sub-system an amount of the drift of its clock relative to the data transmission line high precision clock.

Alternatively, in certain system embodiments of the invention, rather than each sensor module periodically receiving an amount of drift from the data transmission sub-system, each DSP may periodically receive information from outside the system (for example via GPS) to calculate its clock drift. In yet other system embodiments, both techniques may be employed.

Systems of the invention may comprise each DSP in the sensor system upsampling data to a particular fixed sampling rate relative to the high precision clock, and based on this drift using linear or nonlinear interpolation to increase its effective sampling rate. The data may then be downsampled to a fixed sampling frequency relative to the high precision clock. The period between intermittent adjustments of the sampling frequency to the high frequency clock may be determined based on the nominal drift of the sensor module clocks, for example 50 parts per million (ppm), and the level of noise allowed in the system.

Decimation is the process of filtering and downsampling a signal to decrease its effective sampling rate. The filtering is employed to prevent aliasing that might otherwise result from downsampling. The operation of downsampling by factor M∈N describes the process of keeping every Mth sample and discarding the rest. This is denoted by "↑M" in block diagrams. Interpolation is the process of upsampling and filtering a signal to increase its effective sampling rate. The operation of upsampling by factor L∈N describes the insertion of L−1 zeros between every sample of the input signal. This is denoted by "↑L" in block diagrams.

Systems and methods of the invention may operate as follows: we can assume that in the DSP at one stage we have a sampling frequency of X+δ Hz, where "X" is the nominal sampling frequency and "δ" is the DSP clock's deviation from the data transmission line clock or the master clock. In certain embodiments of the invention $\delta$ is calculated and provided periodically to the DSP, for example by the recording station. The sampling frequency, X, is then interpolated to MX, where "M" is an integer. An example may clarify this procedure. In one example at one particular decimation stage in a DSP we assume a sampling frequency of 20 kHz+δ relative to the master clock's sampling frequency. δ is small here. In this particular example we apply a linear interpolation of "approximately" 16 times (i.e., M=16) to 320 kHz. The signal is then downsampled, this time "exactly" 16 times, back to 20 kHz by a downsampling filter and prior to further filtering and downsampling at later decimation stages. The upsampling factor used in interpolation, linear or nonlinear, is largely determined by the level of noise allowed at the output.

Suitable interpolation techniques include any method of constructing new data points from a discrete set of known data points. There are many different interpolation methods, such as linear, polynomial, spline, and the like. Some of the concerns to take into account when choosing an appropriate interpolation algorithm are how accurate is the method, how expensive is it, how smooth is the interpolant, and how many data points are needed. Linear interpolation is generally easier to implement than other interpolation methods, but may not have the desired accuracy. Error is proportional to the square of the distance between the data points. Another disadvantage is that the interpolant is not differentiable at the point of interest. Polynomial interpolation is a generalization of linear interpolation. In linear interpolation, the interpolant is a linear function. In polynomial interpolation the linear interpolant is replaced by a polynomial of higher degree. The interpolation error is proportional to the distance between the data points to the power n, where n is the number of known data points. Furthermore, the interpolant is a polynomial and thus infinitely differentiable. However, polynomial interpolation also has some disadvantages. Calculating the interpolating polynomial may be relatively computationally expensive. Furthermore, polynomial interpolation may not be exact at the end points. These disadvantages can be avoided by using spline interpolation. Spline interpolation uses low-degree polynomials in each of the intervals, and chooses the polynomial pieces such that they fit smoothly together. The resulting function is called a spline. Other forms of interpolation may be used in the systems and methods of the invention by picking a different class of interpolants. Some examples include rational interpolation, which is interpolation by rational functions, and trigonometric interpolation, which is interpolation by trigonometric polynomials. The discrete Fourier transform is a special case of trigonometric interpolation. Another possibility is to use wavelets. Multivariate interpolation is the interpolation of functions of more than one variable, and such methods include bilateral interpolation and bicubic interpolation in two dimensions, and trilateral interpolation in three dimensions.

Systems and methods of the invention may be used in land- and marine-seismic surveying, and may employ wired (copper wires or optical fiber connections) or wireless transmission of data and commands. In any case, the sampling is decoupled from the data transmission. Each DSP/ADC unit has its own clock that is not phase-locked by an electronic device (electronic PLL) to the data transmission line. Stated differently, the systems and methods of the invention, by decoupling the transmission of data from sampling, and avoidance of the need for an electronic PLL, allows the systems and methods of the invention to be less expensive, more robust and flexible for seismic data acquisition systems.

Digital signal processors useful in the invention may be either fixed or floating-point DSPs, and are available from a number of suppliers, including Texas Instruments, Analog Devices, Lucent Technologies, Infineon, and Philips. Programming of fixed or floating-point DSPs may be accomplished using a number of techniques, ranging from programming directly using assembly language, which may be difficult, to programming a higher order code, such as C language, or an object-oriented language such as C++ language, and then using a suitable compiler.

Systems and methods of the invention may be "completely wireless", wherein all wires, cables, and fibers for communication between vibrators, seismic sensors, base stations, and the recording station are substantially eliminated. This does not rule out the use of wires, cables, or fibers (such as optical fibers) for example in the recording station equipment and vibrators, for example for power, and the use of tie-down cables if necessary in windy conditions. In marine systems, this does not rule out towing cables, distance cables, and the like, required to deploy the seismic sources and sensors, deflectors, and the like.

Wireless systems and methods may offer improvements over systems and methods that use wire or optical fiber for communications in terms of one or more of robustness, scalability, cost, and power-efficiency. Systems and methods of the invention allow more efficient seismic data acquisition, for example 3-D and 4-D land seismic data acquisition, such as during exploration for underground hydrocarbon-bearing reservoirs, or monitoring existing reservoirs. Electromagnetic signals may be used to transfer data to and/or from the sensor units, to transmit power, and/or to receive instructions to operate the sensor units.

A simplified schematic view of a land seismic data acquisition system of the invention is illustrated in FIG. 1. An area 2 to be surveyed, may have physical impediments to direct wireless communication between, for example, a recording station 14 (which may be a recording truck) and a vibrator 4a. A plurality of vibrators 4a, 4b, 4c, 4d may be employed, as well as a plurality of sensor unit grids 6a, 6b, 6c, 6d, 6e, and 6f, each of which may have a plurality of sensor units 8. As illustrated in FIG. 1, for example approximately 24-28 sensor units 8 may be placed in the general vicinity around a base station 10. The number of sensor units 8 associated with each base station 10 may vary widely according to the goals of the survey number, however, due to the architecture of the communications between the various components (discussed herein, particularly with reference to FIGS. 3 and 4), the number should be less than required in previously known systems. Circles 12 indicate the approximate range of reception for each base station 10. This range may be the same or different for each base station.

The system illustrated in FIG. 1, using the plurality of sensor units 8, may be employed in acquiring and/or monitoring land-seismic sensor data for area 2, and transmitting the data to the one or more base stations 10. All communications between vibrators 4, base stations 10, recording station 14, and seismic sensors 8 are completely wireless, as that term is defined herein. Alternatively, systems of the invention may be described as comprising a wireless data network, for example as illustrated schematically in FIG. 2, wherein the wireless data network comprises multiple seismic sensors 8 transmitting at least a portion of the seismic data they sense to the one or more base stations 10 via first wireless links 9, which in turn transmit at least some data they receive to the recording station 14 via second wireless links 16. Commands may be sent from recording station 14 to vibrators 4 via wireless links 18, and, to the extent data is exchanged between vibrators 4 and recording station 14, wireless links 18 may also be considered part of the wireless data network.

First wireless links 9 may be characterized as Wireless Personal-Area Networks (WPAN). A "WPAN" is a personal area network (PAN) using wireless connections. WPAN is currently used for communication among devices such as telephones, computers and their accessories, as well as personal digital assistants, within a short range. The reach of a PAN is typically within about 10 meters. These protocols may include, but are not limited to Bluetooth (registered certification mark of Bluetooth SIG, Inc., Bellevue Wash.), ZigBee (registered certification mark of ZigBee Alliance Corporation, San Ramon, Calif.), Ultra-wideband (UWB), IrDA (a service mark of Infrared Data Association Corporation, Walnut Creek, Calif., HomeRF (registered trademark of HomeRF Working Group Unincorporated Association Calif., San Francisco, Calif.), and the like. Bluetooth is the most widely used technology for the WPAN communication. Each technology is optimized for specific usage, applications, or domains. Although in some respects, certain technologies might be viewed as competing in the WPAN space, they are often complementary to each other.

The IEEE 802.15 Working Groups is the organization to define the WPAN technologies. In addition to the 802.15.1 based on the Bluetooth technology, IEEE proposed two additional categories of WPAN in 802.15: the low rate 802.15.4 (TG4, also known as ZigBee) and the high rate 802.15.3 (TG3, also known as Ultra-wideband or UWB). The TG4 ZigBee provides data speeds of 20 Kbps or 250 Kbps, for home control type of low power and low cost solutions. The TG3 UWB supports data speeds ranging from 20 Mbps to 1 Gbps, for multi-media applications. In the Table 1, the main characters of the WPAN technologies as specified in the IEEE 802.15 are delineated.

TABLE 1

Wireless Personal Area Network Characteristics

| Parameters | Bluetooth (IEEE 802.15.1) | UWB (IEEE 802.15.3) | ZigBee (IEEE 802.15.4) |
|---|---|---|---|
| Applications | Computer and accessory devices Computer to compute Computer with other digital devices | Multimedia content transfer, High-resolution radar, Ground-penetrating radar, Wireless sensor network, Radio locations systems | Home control Building automation Industrial automation Home security Medical monitoring |
| Frequency Band: | 2.4-2.48 GHz | 3.1-10.6 GHz | 868 MHz 902-928 MHz 2.4-2.48 GHZ |
| Range | ~10 meters | ~10 meters | ~100 meters |
| Maximum Data transfer rate: | 3 Mbps | 1 Gbps | 20 Kbps 40 Kbps 250 Kbps |
| Modulation | GFSK, 2PSK, DQSP, 8PSK | OPSK, BPSK | BPSK (868/928 MHz) OPSK (2.4 GHz) |

In wired communication systems, mesh network topology is one of the key network architectures in which devices are connected with many redundant interconnections between network nodes such as routers and switches. (See definition of mesh topology in the networkdictionary.com) In a wired communication system using mesh topology, if any cable or node fails, there are many other ways for two nodes to communicate. While ease of troubleshooting and increased reliability are definite pluses, wired mesh networks are expensive to install because they use a lot of cabling. Often, a mesh topology will be used in a wired communication system in conjunction with other topologies (such as Star, Ring and Bus) to form a hybrid topology. Some WAN architecture, such as the Internet, employ mesh routing. Therefore the Internet allows sites to communicate even during a war.

Figure 3:
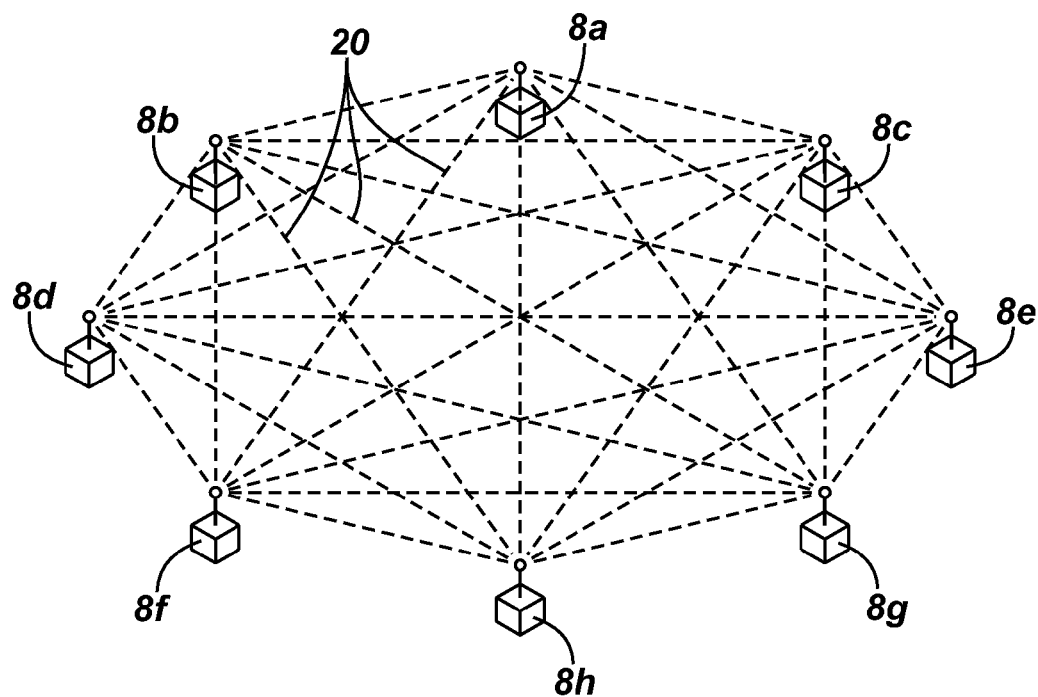
FIGS. 3-4 illustrate schematically prior art communication topologies useful in practicing systems and methods of the invention.
Figure 4:
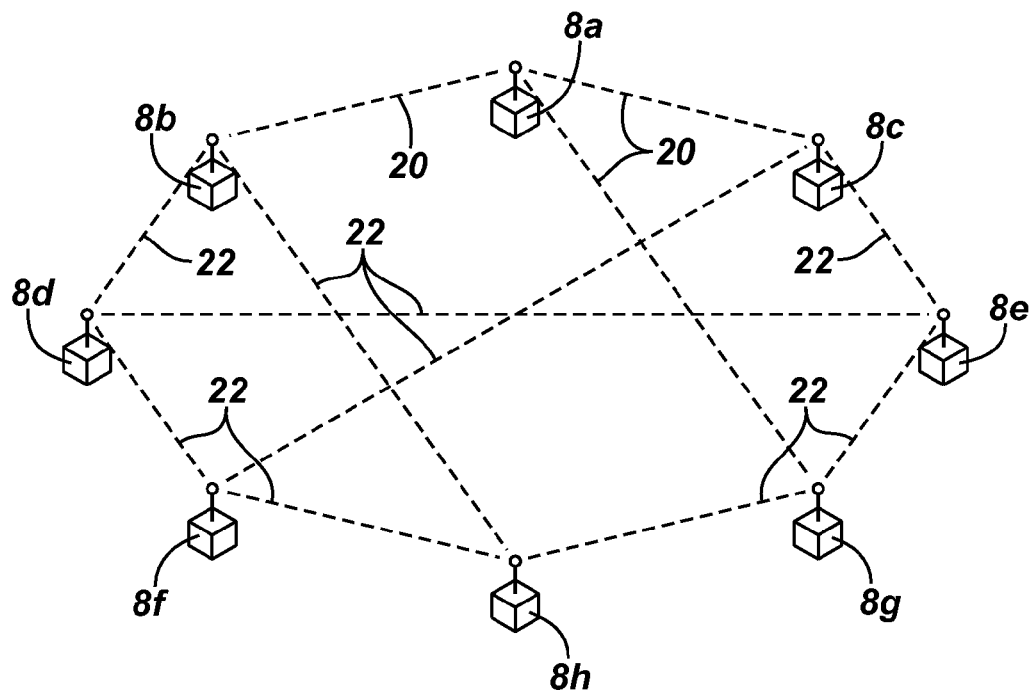

There are two types of mesh topologies: full mesh (as depicted in FIG. 3) and partial mesh (as depicted in FIG. 4). Full mesh topology occurs when every node has a circuit connecting it to every other node in a network. In wired networks, full mesh is very expensive to implement but yields the greatest amount of redundancy, so in the event that one of those nodes fails, network traffic can be directed to any of the other nodes. Full mesh is usually reserved for backbone networks. With partial mesh, some nodes are organized in a full mesh scheme but others are only connected to one or two in the network. Partial mesh topology is commonly found in peripheral networks connected to a full meshed backbone. It is typically less expensive to implement and yields less redundancy than full mesh topology.

In wireless systems and methods of the invention, due to the wireless nature of the communications using a wireless data network architecture, redundancy, robustness, and flexibility, are all increased, while cost as reduced. As illustrated in the full mesh topology of FIG. 3, sensors 8a-8h may communicate wirelessly directly with each other sensor through multiple direct wireless links 20. In other embodiments, for example as illustrated in the partial mesh topology of FIG. 4, sensor 8a may communicate wirelessly directly with only sensors 8b, 8c and 8g via wireless communications 20, and indirectly with sensors 8d, 8e, 8f, and 8h though wireless communication links 22.

Figure 2:
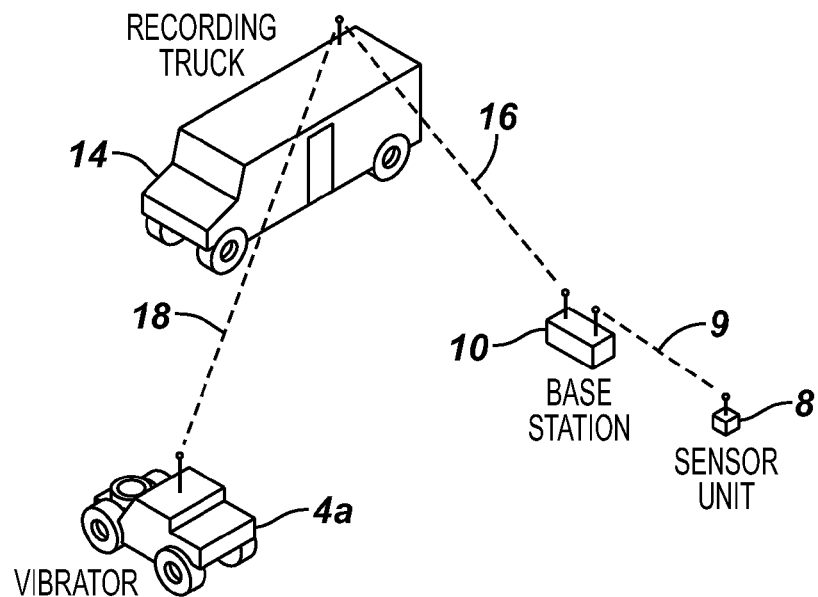
FIG. 2 illustrates schematically wireless communication between components of systems of the invention.

The second and third wireless links (i.e., links 16 and 18, respectively, as illustrated in FIG. 2) may be individually selected from any wireless communication protocol that supports point to multi-point (PMP) broadband wireless access. These protocols may include, but are not limited to IEEE standard 802.16 (sometimes referred to as the WiMax (Worldwide Interoperability for Microwave Access) standard), IEEE standard 802.20, and the like. The IEEE wireless standard presently has a range of up to 30 miles (48 km), and presently can deliver broadband at around 75 megabits per second, although the invention is not so limited. This is theoretically, 20 times faster than a commercially available wireless broadband.

The IEEE 802.16 WiMax standard was published in March 2002 and provided updated information on the Metropolitan Area Network (MAN) technology. The extension given in the March 2002 publication extended the line-of-sight fixed wireless MAN standard, focused solely on a spectrum from 10 GHz to 60+ GHz. This extension provides for non-line of sight access in low frequency bands like 2-11 GHz. These bands are sometimes unlicensed. This also boosts the maximum distance from 31 to 50 miles (50 to 80 km) and supports PMP (point to multipoint) and mesh technologies. The IEEE approved the 802.16 standards in June 2004. WiMax may be used for wireless networking like the popular WiFi. WiMax, a second-generation protocol, allows higher data rates over longer distances, efficient use of bandwidth, and avoids interference almost to a minimum. WiMax can be termed partially a successor to the Wi-Fi protocol, which is measured in feet, and works over shorter distances.

As used in the context of seismic data acquisition in systems of the invention, the seismic sensors and base stations may be compared to a metropolitan area networking (MAN), as given in the 802.16 standard, sometimes referred to as fixed wireless. In fixed wireless, a backbone of base stations is connected to a public network. As with a MAN, each of base station 10 supports many "fixed subscriber stations" (sensor units 8), which are akin to either public WiFi hot spots or fire walled enterprise networks. Base stations 10 use a media access control (MAC) layer, and allocate uplink and downlink bandwidth to "subscribers" (sensor units 8) as per their individual needs. This is basically on a real-time need basis. The MAC layer is a common interface that makes networks interoperable. In the future, one can look forward to 802.11 hotspots, hosted by 802.16 MANs. These would serve as wireless local area networks (LANs) and would serve the end users directly too.

Figure 5:
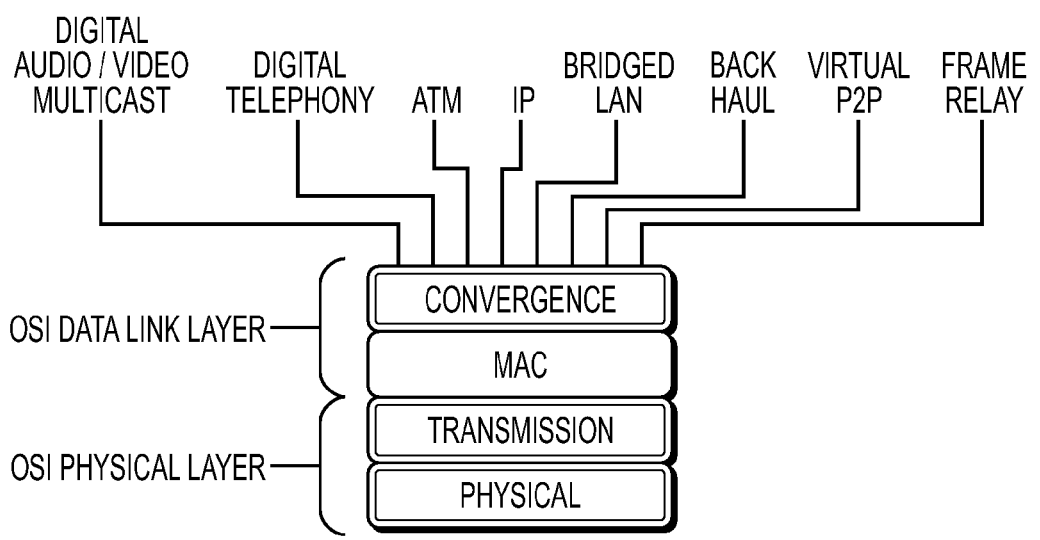
FIG. 5 illustrates the protocol structure of the IEEE 802.16 Broadband wireless MAN standard.

WiMax has two main topologies, either of which may be used in systems and methods of the present invention, namely Point to Point for backhaul and Point to Multi Point Base station for Subscriber station. In each of these situations, multiple input multiple output antennas may be used. The protocol structure of IEEE 802.16 Broadband wireless MAN standard is illustrated in FIG. 5. FIG. 5 shows four layers: convergence, MAC, transmission and physical. These layers map to two of the lowest layers, physical and data link layers of the OSI model.

Use of WiMax protocol provides systems and methods of the invention and their end users many user applications and interfaces, for example Ethernet, TDM, ATM, IP, and VLAN. The IEEE 802.16 standard is versatile enough to accommodate time division multiplexing (TDM) or frequency division duplexing (FDD) deployments and also allows for both full and half-duplex terminals.

IEEE 802.16 supports three physical layers. The mandatory physical mode is 256-point FFT OFDM (Orthogonal Frequency Division Multiplexing). The other modes are Single carrier (SC) and 2048 OFDMA (Orthogonal Frequency Division Multiplexing Access) modes. The corresponding European standard—the ETSI Hiperman standard defines a single PHY mode identical to the 256 OFDM modes in the 802.16d standard.

The MAC was developed for a point-to-multipoint wireless access environment and can accommodate protocols like ATM, Ethernet and IP (Internet Protocol). The MAC frame structure dynamic uplink and downlink profiles of terminals as per the link conditions. This entails a trade-off between capacity and real-time robustness. The MAC uses a protocol data unit of variable length, which increases the standards efficiency. Multiple MAC protocol data unit may be sent as a single physical stream to save overload. Also, multiple Service data units (SDU) may be sent together to save on MAC header overhead. By fragmenting, large volumes of data (SDUs) may be transmitted across frame boundaries and may guarantee a QoS (Quality of Service) of competing services. The MAC uses a self-correcting bandwidth request scheme to avoid overhead and acknowledgement delays. In systems and methods of the invention, this feature may also allows better QoS handling than previously known systems and methods. The terminals have a variety of options to request for bandwidth depending on the QoS and other parameters. The signal requirement can be polled or a request can be piggybacked.

In systems and methods of the invention, the 802.16 MAC protocol may perform Periodic and Aperiodic activities. Fast activities (periodic) like scheduling, packing, fragmentation and ARQ may be hard-pressed for time and may have hard tight deadlines. They must be performed within a single frame. The slow activities, on the other hand, may execute as per pre-fixed timers, but are not associated with any timers. They also do not have specific time frame or deadline.

Table 2 compares similarities and differences in the first wireless and second and third wireless links useable in systems and methods of the invention (borrowed from Javvin.com).

TABLE 2

Comparable Properties of First and Second Wireless Links

| Parameters | WiMax | WLAN | Bluetooth |
|---|---|---|---|
| Frequency | 2-11 GHz | 2.4 GHz | Varies |
| Range | ~31 miles (50 km) | ~100 metres | ~10 metres |
| Data Transfer Rate | 70 mbps | 11-55 mbps | 20-55 mbps |
| Users | 1000 s | >10 | >10 |

The 802.11 is based on a distributed architecture, whereas, WiMax is based on a centrally controlled architecture. In this the scheduler residing in the Base station (BS) has control of the wireless media access. WiMax can support multiple connections conforming to a set of QoS parameters and provides the packet classifier ability to map the connections to many user applications and interfaces.

Certain embodiments of systems and methods of the invention may use a wireless data network based on a newer protocol, IEEE 802.20. This standard, like the 802.16 standard, is aimed at wireless high-speed connectivity to mobile consumer devices like cellular phones, PDAs and laptop computers. The IEEE 802.20 Mobile Broadband Wireless Access Working Group is developing an air-interface standard for mobile BWA systems that operate in licensed bands below 3.5 GHz. It is targeting peak data rates of over 1 Mb/s per user at vehicular speeds to 250 km/hour. This maybe useful for systems of the invention using, for example, a moving data recoding stations, for example a moving truck, an airplane or helicopter, rather than a stationary recording station. Systems and methods using this standard will operate in the 500 MHz-3.5 GHz range. Currently, this protocol is offered by QUALCOMM Flarion Technologies, Bedminster, N.J., and ArrayComm, San Jose, Calif.

Systems and methods of the invention may include provision of multi-antenna signal processing (MAS) software architectures for implementation of the second and/or third wireless links employing WiMAX. The WiMAX profiles support both adaptive antenna system (AAS) and multiple-input/multiple-output (MIMO) architectures in baseline form. MAS implementation, such as though use of the product known under the trade designation "A-MAS" from Array-Comm, may enhance baseline MIMO through the addition of essential interference mitigation. Generic MIMO systems provide link robustness and enhance point-to-point data rates by transmitting signals multiple times and/or transmitting multiple signals. Without active interference mitigation, these additional transmissions incur the cost of decreased signal-to-interference ratios for co-channel users in other cells. In the single-cell environments typified by wireless LANs, where MIMO techniques have seen their first commercial success, this increased interference has no adverse effects. In a networked system such as WiMAX where multiple cells share the same spectral resources, the increased interference degrades network capacity and overall service quality, even though it may improve links for some users. It also prevents the use of MIMO techniques for enhancing data rates outside the cell center. By combining AAS techniques with MIMO in our A-MAS solution, MIMO's benefits can be realized throughout the cells in the network, simplifying network planning and providing performance improvements operators can rely on. A-MAS software may run as a synthesizable core or as an embedded DSP code within common ASIC architectures, integrating into client device physical layers through modular interfaces. The approach taken by software products such a that known as A-MAS takes precise control of the space dimension and puts radio energy (or receive sensitivity) only where its really required. The software drives an array of two or more antennas on either the client device, the base station, or both, leveraging the principle of coherent combinations of radio waves to create a focus of transmit energy (or receive sensitivity) on the intended recipient (sender) and the absence of energy (sensitivity) on sources of co-channel interference. As applied in the context of inventive methods and systems, A-MAS-enabled base stations and sensor units may take advantage of all the possible gains from using multiple antennas: link budget improvements from diversity and combining gains, along with client data rate and overall network capacity benefits from active interference mitigation and spatial mutliplexing.

Systems and methods of the present invention solve or reduce problems associated with cable-based land seismic systems, or previously known sensor unit-based systems for acquisition of time-lapse land seismic data, namely cost, power and data transfer.

Land sensor units useable in the invention may include, in addition to measurement sensors, a high-precision clock, low-power electronics, long-term battery and memory components, and an autonomous power generating unit which provides power to charge the batteries in the sensor units without being reliant on power charge from external means.

The sensor units may remain on the land between seismic surveys or be removed therefrom. During idle periods, an autonomous power generation component, if present, will generate enough power to recharge the autonomous power source, which may be one or more rechargeable batteries, one or more capacitors, and the like. Batteries and capacitors may be based on any chemistry as long as they are self-sufficient for the duration intended, which may be months to years. Batteries or battery cells such as those known under the trade designation "Li-ion VL45E", available from SAFT, Bagnolet, France, may be used. Another alternative is to use capacitors as storage devices for power. Capacitors are smaller and have higher storage capacity, such as discussed in the publication "Researchers fired up over new battery", MIT News Office, Feb. 8, 2006, incorporated herein by reference. Furthermore, sensor units of the invention may be placed in "sleep" mode for energy conservation during periods of no operation.

"Autonomous power generation" components are to be distinguished from "autonomous power sources." As used herein, the phrase "autonomous power generation" is an optional, but highly desirable feature for sensor units of the invention, and refer to one or more components allowing the autonomous power source or sources to be regenerated, recharged, or replenished, either fully or partially, in order that the seismic sensor unit may remain on the land between seismic surveys. While in theory this may be possible through power brought to the seismic sensor unit by means of a vehicle, this is a slow and cumbersome process. Instead, the sensor units of the present invention may include a means of extracting power from their local environment, sometimes referred to as energy harvesting. Examples of suitable autonomous power generation components include those which may use wind energy, solar energy, and the like, which may be transformed into electrical energy by known means of energy conversion. The autonomous power sources (batteries, for example) may be recharged during periods between seismic surveys which could be anywhere between a few months and one to two years.

Sensors useable in the invention for land-based seismic may be individual sensors or a package of two or more sensors. One suitable sensor package is that known under the trade designation "4C Sensor" available from WesternGeco LLC, comprised of three geophones or accelerometers.

Sensor units useable in the invention may also comprise an electronics module having ultra-low power requirements, and may include a high-precision clock, an analog-to-digital converter, power management software and hardware, and a control module for data input/output.

The total power consumption of the digitizing electronics within a sensor unit may be expected to not exceed 50 mWatt. In addition, by using low-power memory (for example flash EPROM), the total power consumption of the complete inventive sensor units is not expected to exceed 150 mW at any time. This is at least a factor of 10 less than with current technology used in land sensor units. The battery capacity that is needed to provide power to an inventive sensor unit for a typical seismic survey period of six weeks is only 150 Wh. Rechargeable Li-Ion batteries may provide approximately 350 Wh/1 and 150 Wh/kg, hence the total battery volume and weight is expected approximately 0.41 liter and 0.6 kg.

Data that is recorded by the land sensor units may be transferred to the base stations, and in turn to the recording station. In other embodiments it may be desirable to remove and transport one or more memory modules from a particular sensor unit. For example, one might equip a sensor unit with N memory modules for N surveys. In these embodiments, for example, for each survey one memory module is taken out. Both methods of data transfer may be used. In certain embodiments data transfer may be achieved through multiple channels and/or by multiple methods in order to increase the speed and/or amount of the data transmission.

Methods of using systems of the invention may include measurement, calculation and other sub-systems useful in implementing methods of the invention. Calculation units may include software and hardware allowing the implementation of one or more equations, algorithms and operations as required, as well as access databases, data warehouses and the like, via wire or wireless transmission.

The initial position to within few meters of accuracy of one or more sensor units of the invention may be determined for instance by using GPS.

The performance of a marine seismic acquisition survey typically involves one or more vessels towing at least one seismic streamer through a body of water believed or known to overlie one or more hydrocarbon-bearing formations. WesternGeco L.L.C., Houston, Tex., currently conducts high-resolution Q-Marine™ surveys, in some instances covering many square kilometers. A survey vessel known as a O-Technology™ vessel may conduct seismic surveys towing multiple, 1000-12000-meter cables with a separation of 25-200 meters, using the WesternGeco proprietary calibrated Q-Marine™ source. "Q" is the WesternGeco proprietary suite of advanced seismic technologies for enhanced reservoir location, description, and management. For additional information on Q-Mariner" ", a fully calibrated, point-receiver marine seismic acquisition and processing system, as well as Q-Land™ and Q-Seabed™. The seismic vessel and streamers progress forward at about 5 knots and the system is able to cover large areas of open ocean relatively efficiently. Thus, the traditional towed streamer seismic acquisition system is well-suited to explore the geological structures of previously unexplored or unexploited areas.

It is within the invention to interface systems of the invention with other data acquisition systems and methods, for example other land seismic data acquisition systems, such as cable-based systems, and systems using previously known land seismic systems. As one non-limiting example, where a reliable land cable has been operating successfully, one might use that land cable and its sensors, and position sensor units in a grid on one or both sides of the cable.

In certain embodiments, regardless of the environment or survey area, a higher density of land sensor units throughout the spread may improve overall operational efficiency by decreasing the distances between the sensor units and the associated degradation of wireless signals. The shape of the sensor units or grids of sensor units is not in itself relevant.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A seismic data acquisition system comprising:
   one or more seismic sources;
   a plurality of sensor modules configured to asynchronously sample seismic data, wherein respective sensor modules comprise an analog seismic sensor, an A/D converter (ADC) for generating digitized seismic data, a digital signal processor (DSP), and a sensor module clock;
   a seismic data recording station; and
   a seismic data transmission sub-system comprising a high precision clock, the sub-system allowing transmission of at least some of the digitized seismic data to the recording station, wherein the respective sensor modules are configured to periodically receive from the sub-system a calculated amount of drift of its respective sensor module clock relative to the high precision clock.

2. The system of claim 1 adapted to perform land seismic data acquisition.

3. The system of claim 1 adapted to perform marine seismic data acquisition.

4. The system of claim 1 wherein respective DSPs are configured to upsample digitized seismic data at a first fixed sampling rate relative to the high precision clock.

5. The system of claim 4 wherein the digitized seismic data is upsampled by the respective DSPs using an interpolation technique selected from linear and nonlinear interpolation, based on the calculated amount of drift, to increase the respective sensor modules' effective sampling rate.

6. The system of claim 5 wherein the respective DSPs are configured to periodically downsample the digitized seismic data at a second fixed sampling rate relative to the high precision clock.

7. The system of claim 1 wherein the respective sensor modules are configured to periodically receive from the sub-system the calculated amount of drift of its sensor module clock relative to the high precision clock based on a nominal drift of the sensor module's clock and a level of noise in the system.

8. The system of claim 1 further comprising one or more base stations for receiving the digitized seismic data from the plurality of sensor modules via first wireless links, wherein the plurality of sensor modules are disposed proximate to the one or more base stations.

9. The system of claim 8 wherein at least one group of sensor modules of the plurality of sensor modules relays at least some of the digitized seismic data wirelessly within the at least one group via a communication topology selected from a partial mesh topology, a mesh topology, and a star topology.

10. The system of claim 8 wherein at least one group of sensor modules of the plurality of sensor modules relays data packets wirelessly within the at least one group via multi-hopping.

11. The system of claim 8 wherein the one or more base stations are selected from mobile and non-mobile communication devices.

12. The system of claim 8 wherein the first wireless links are selected from wireless personal area network (WPAN) communication protocols.

13. The system of claim 12 wherein the WPAN communication protocols are independently selected from protocols covered by IEEE standard 802.15.

14. A seismic data acquisition system comprising:
    one or more seismic sources;
    a plurality of sensor modules configured to asynchronously sample seismic data, wherein respective sensor modules comprise an analog seismic sensor, an A/D converter (ADC) for generating digitized seismic data, a digital signal processor (DSP), and a sensor module clock;
    a seismic data recording station; and
    a seismic data transmission sub-system comprising a high precision clock in communication with a global positioning system, the sub-system allowing transmission of at least some of the digitized seismic data to the recording station, wherein the respective sensor modules are configured to periodically receive from the sub-system a calculated amount of drift of its respective sensor module clock relative to the high precision clock.

15. The system of claim 14 wherein respective DSPs are configured to upsample digitized seismic data at a first fixed sampling rate relative to the high precision clock.

16. The system of claim 15 wherein the digitized seismic data is upsampled by the respective DSPs using an interpolation technique selected from linear and nonlinear interpolation, based on the calculated amount of drift, to increase the respective sensor modules' effective sampling rate.

17. The system of claim 14 wherein the respective sensor modules are also configured to periodically receive from the sub-system information sufficient to calculate the amount of drift.

* * * * *